Patented Feb. 7, 1950

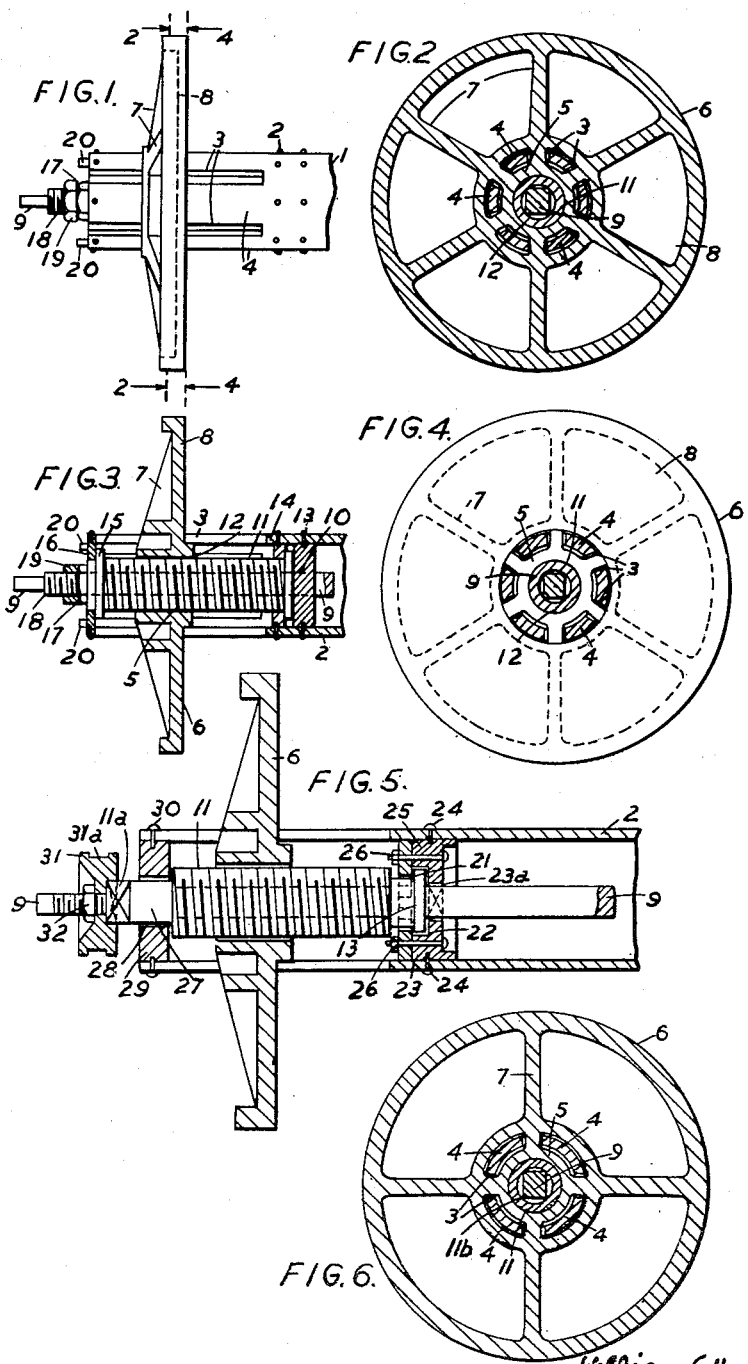

2,496,844

UNITED STATES PATENT OFFICE 2,496,844

WARP BEAM

William Attenborough, Beeston, England, assignor to Frederick William Radford, Chilwell, England Application August 6, 1947, Serial No. 766,640
In Great Britain April 9, 1946

Section 1, Public Law 690, August 8, 1946
Patent expires April 9, 1966

11 Claims. (Cl. 242—124)

This invention is for improvements in or relating to warp beams. A warp beam is used in warping, sizing, dressing and weaving processes to accommodate a considerable number of warps (e. g. corresponding to a dress width of warps) side by side, and end flanges are usually provided (on the beam) which are adjustable axially of the beam according to the overall width of the warps. Heretofore, the flanges have been adjustable by being screwed onto the ends of the beam which for this purpose is screw threaded on its exterior surface at each end and screwed nuts are provided (which may be locked by set screws transfixing them and bearing on the beam screw threads) for locking the flanges in any desired position along the beam screw threads.

One disadvantage of the foregoing arrangement is that when the flanges are located at an intermediate position along the beam screw threads, those screw threads at the inner side of the flanges are exposed to the warps with the result that the warps become entangled with the screw threads. A further disadvantage is that there is a tendency for the flanges and lock nuts to turn relatively to the beam, thereby tightening them on the beam to such an extent that considerable force must be used to release them for adjustment purposes; this results in the screw threads becoming worn or damaged after repeated adjustments and when, in fact, the screw threads do become worn or damaged, it has been known for the flanges to be forced by the warps (which exert considerable force endwise of the beam) completely off the beam.

An object of the invention is to provide a warp beam which is adjustable for length thereby rendering it capable of accommodating any desired number of warps (e. g. corresponding to a dress width of warps) side by side, while at the same time retaining a substantially cylindrical configuration for the beam and avoiding exposed screw threads such as would be detrimental to the layers of warps next to the beam barrel.

Another object is to provide such an improved adjustable mounting for the flanges that they are less likely to be forced off the beam by the warps.

The present invention provides a warp beam having at least at one end a hollow cylindrical portion, at least one axial slot in said portion, an end flange comprising a boss located in the interior of the hollow portion of the beam and at least one connecting member or spoke extending out from the boss through the slot, and adjustment means for adjusting the end flange axially of the beam, the connecting member or spoke travelling along the slot in such movement. It will therefore be appreciated that the beam barrel retains its substantially cylindrical form at this end, the width of the slot or slots being insufficient to modify this shape to any pronounced extent. Preferably there is a plurality of spokes joined at the exterior of the beam by a circular disc surrounding the beam and having a peripheral rim. The adjustable means preferably comprises an adjustment screw extending through the boss in the interior of the beam; the threads of this screw are therefore not exposed into contact with the warps. Specifically, there may be a spindle extending axially within the split end and the barrel and an exteriorly-threaded sleeve rotatably mounted on the spindle but restricted against axial movement and engaging a threaded bore in the boss of the flange; therefore by rotating this sleeve on the spindle, the flange may be shifted axially of the beam.

The foregoing mechanism may be provided at one end only of the beam or at both ends.

The foregoing and other features of the invention are incorporated in the warp beam which will now be described as an example with reference to the accompanying drawings in which—

Figure 1 is an elevational view of a representative end of a warp beam according to this invention.

Figure 2 is a cross sectional view on line 2—2 of Figure 1.

Figure 3 is a longitudinal section of Figure 1 and

Figure 4 is a cross-sectional view on line 4—4 of Figure 1.

Figure 5 is an enlarged cross sectional view of a modified arrangement.

Figure 6 is a reduced sectional view of Figure 5.

In the preferred construction a beam according to this invention is provided with an adjustable flange at both ends thereof but since the mechanism at the two ends is identical it is only necessary to describe and illustrate that at one end. Referring now to Figures 1 to 4 of the drawings, a beam 1 comprises a tubular barrel 2 of metal which at the said end is split by axially-extending circumferentially-spaced slots 3 into axial fingers 4; (the number of these slots is a matter of choice); for example, there may be six. Inside the split end of the barrel 2 there is a substantially cylindrical boss 5 (Figure 2) of an end flange 6 the said boss 5 or an extension thereof being preferably of such a diameter that the fingers 4 fit around its periphery. From the boss six spokes or ribs 7 extend radially, these spokes being of flattened form so that each of them lies substantially in a plane in which the axis of the beam lies. The spokes 7 extend outwards through the slots 3 and at the exterior of the barrel are integral with a disc-like flange-wall 8 which is located in a plane normal to the axis of the beam. It will therefore be appreciated that the flange 6 is capable of movement lengthwise of the barrel 2, the spokes or ribs 7 sliding along the slots 3 so that by this movement the effective length of the beam between the flange walls 8 may be varied.

The mechanism by which each end flange 6 is adjusted is as follows. A pike or spindle 9 extends axially within the split end of the barrel 2 from an anchorage such as a plug 10 located inwardly of the ends of the slots 3 and fixed to the barrel; the pike or spindle 9 projects from the end of the barrel 2 so the projecting end of the pike or spindle 9 serves as a trunnion or spindle on which the beam is rotatably mounted. The main part of the spindle 9 serves to support an exteriorly screwed rotatable sleeve 11 which is engaged in a screw threaded central bore 12 in the flange boss 5. Means are provided for restraining the sleeve 11 against movement along the spindle 9 with the result that if the sleeve 11 is rotated the flange 6 is adjusted axially of the beam 1, and for this purpose the sleeve 11 is provided at its inner end with a flange 13 Figure 3 which is rotatably mounted between the plug 10 fixed within the barrel 2 and a ring or inwardly directed flange 14 secured to the interior of the barrel 2. Furthermore, near its outer end the sleeve 11 has a ring 15 fixed to it constituting a flange which abuts against the inner surface of an annular end disc 16 to the outer periphery of which the free ends of the fingers 4 are secured.

In order that the sleeve 11 may be rotated to adjust the axial position of the flange the outer end of the sleeve 11 protrudes through the end disc 16 and is provided with flats, or a square or hexagon 17, or other means, the arrangement being such that the sleeve may be rotated while the beam and flange is held stationary or the sleeve may be held stationary while the beam and flange are rotated.

Any suitable means may be provided for locking the flange 6 in its adjusted position. For example, the portion of the spindle adjacent the hexagon 17 may be threaded as shown at 18 and may accommodate a locking nut 19. Such locking nut 19 may be employed for locking a ruffle in position, the outer face of the end disc 16 having ruffle mounting lugs 20.

The adjustable warp beam thus described has many advantages. The screw threads of the sleeve 11 are not exposed, the barrel 2 may be made of a thin aluminium or light alloy, accidental displacement of the end flange 6 is impossible, and said flange is held square in relation to the beam.

In the alternative arrangement shown in Figures 5 and 6 the end flange 13 of the sleeve 11 is formed by providing an annular groove 21 and the flange is accommodated in a bore 22 of a flanged ring 23 which is fixed by pins or screws 24 or the like to the barrel 2. Endwise movement of the sleeve is prevented by a ring 25 which is provided in two halves to permit its assembly around the annular groove and which is fixed to the ring 23 by bolts 26.

The outer end of the sleeve has a reduced part shown at 27 accommodated in the bore 28 of an end ring 29 fixed by screws 30 or the like to the barrel 2. The extremity 11a of the sleeve is squared to receive a spanner or the like for rotating the sleeve relatively to the beam when it is required to adjust the flange.

The spindle 9 is of square section for the major part of its length and extends right through the beam. It has mounted on it the ruffle or pulley 31 which has a square bore 31a engaging the end of the squared part of the spindle and which is locked in position by a lock nut 32.

Driving connection between the spindle 9 and the barrel 2 is provided by a squared bore 23a in the flanged ring 23 engaging the squared spindle 9.

There may be any convenient number of spokes (and slots 3 therefore) for the flange but preferably as shown in Figure 6 there are four slots 3 and four spokes 7.

When it is desired to adjust the flange the nut 32 is first slackened off to permit the sleeve 11 being turned relatively to the beam.

It will be appreciated that although the spindle 9 is squared the sleeve 11 is provided with a circular bore of greater diameter than the greatest thickness of the spindle and that bearings for the sleeve are provided at its ends by the rings 25 and 30 in such manner that rotation of the sleeve is permitted relatively to the spindle 9.

I claim:

1. A warp beam having at least at one end a hollow cylindrical portion, at least one axial slot in said portion, an end flange comprising a boss located in the interior of the hollow portion of the beam and at least one spoke extending out from the boss through the slot, a spindle extending axially within the beam and through the boss, an exteriorly screw threaded sleeve rotatably mounted on the spindle, a screw threaded axial bore in the boss through which the sleeve extends with a screw engagement, and means for restraining the sleeve against axial movement.

2. A warp beam having at least at one end a hollow cylindrical portion, spaced axial slots in said portion, an end flange comprising a boss located in the interior of the hollow portion of the beam and spokes extending out from the boss through the slots, a spindle extending axially within the beam and through the boss, an exteriorly screw threaded sleeve rotatably mounted on the spindle a screw threaded axial bore in the boss through which the sleeve extends with a screw engagement, means for restraining the sleeve against axial movement, means associated with the sleeve for rotating it relatively to the beam, and means for temporarily locking the sleeve against rotational movement relatively to the beam when desired.

3. A warp beam having at each end a hollow cylindrical portion, spaced axial slots in each of said end portions of the beam, a flange at each end of the beam each comprising a boss located in the interior of the appropriate end portions of the beam, spokes extending out from the boss through the appropriate slots and a flanged ring on the exterior of the beam joining the spokes together, a screwed axial bore in each of said bosses, an externally screw threaded sleeve transfixing each of said bosses with a screw engagement, means for restraining each sleeve against axial movement relating to the beam, means associated with each sleeve by which it may be rotated relatively to the beam, means for temporarily locking each sleeve against rotational movement relatively to the beam when desired, a spindle extending through the beam and freely through the screwed sleeve and means for fixing the spindle relatively to the beam.

4. A warp beam having at least at one end a hollow cylindrical portion, spaced axial slots in said portion, an end flange comprising a boss located in the interior of the hollow portion of the beam and spokes extending out from the boss through the slots, a spindle extending axially within the beam and through the boss, an exteriorly screw threaded sleeve rotatably mounted on the spindle, a screw threaded axial bore in the boss through which the sleeve extends with a screw engagement, bearings provided within the hollow portion of the beam at each end of the sleeve for supporting the latter and restraining it against axial movement, means associated with the sleeve for rotating it relatively to the beam, and means for temporarily locking the sleeve against rotational movement relatively to the beam when desired.

5. A warp beam having at least at one end a hollow cylindrical portion, spaced axial slots in said portion, an end flange comprising a boss located in the interior of the hollow portion of the beam and spokes extending out from the boss through the slots, a spindle extending axially within the beam and through the boss, the spindle including an exterior angular portion, bush means disposed in the hollow portion of the beam for receiving the angular portion of the spindle and thus supporting the same and restraining it against rotation relative thereto, ruffle means attached to a protruding end portion of the spindle outside the beam for providing a driving connection to the beam, an exteriorly screw threaded sleeve rotatably mounted on the spindle, a screw threaded axial bore in the boss through which the sleeve extends with a screw engagement, means for restraining the sleeve against axial movement, means associated with the sleeve for rotating it relatively to the beam, and means for temporarily locking the sleeve against rotational movement relatively to the beam when desired.

6. A warp beam having at least at one end a hollow cylindrical portion, at least one axial slot in said portion, an end flange comprising an interiorly screw threaded sleeve shaped portion located in the interior of said hollow portion of the beam and at least one spoke extending out from said sleeve shaped portion through said slot, an exteriorly screw threaded relatively short sleeve rotatably mounted within said hollow cylindrical portion of said beam passing through said interiorly screw threaded sleeve shaped portion of said end flange in screw engagement with the same, a projection on the outer end of said exteriorly screw threaded relatively short sleeve projecting outwardly through the open end of said hollow cylindrical portion of said warp beam, and means at each end of said exteriorly screw threaded relatively short sleeve for restraining the same against axial movement.

7. A warp beam having at least at one end a hollow cylindrical portion, at least one axial slot in said portion, an end flange comprising an interiorly screw threaded sleeve shaped portion located in the interior of said hollow portion of the beam and at least one spoke extending out from said sleeve shaped portion through said slot, an exteriorly screw threaded relatively short cylindrical member rotatably mounted within said hollow cylindrical portion of said beam passing through said interiorly screw threaded sleeve shaped portion of said end flange in screw engagement with the same, a projection on the outer end of said exteriorly screw threaded relatively short cylindrical member projecting outwardly through the open end of said hollow cylindrical portion of said warp beam, means for restraining said exteriorly screw threaded cylindrical member against axial movement, and means for temporarily locking said exteriorly screw threaded relatively short cylindrical member against rotational movement relative to said warp beam, whenever desired.

8. A warp beam having at least at one end a hollow cylindrical portion, at least one axial slot in said portion, an end flange comprising an interiorly screw threaded sleeve shaped portion located in the interior of said hollow portion of the beam and at least one spoke extending out from said sleeve shaped portion through said slot, an exteriorly screw threaded relatively short sleeve rotatably mounted within said hollow cylindrical portion of said beam passing through said interiorly screw threaded sleeve shaped portion of said end flange in screw engagement with the same, a projection on the outer end of said exteriorly screw threaded relatively short sleeve projecting outwardly through the open end of said hollow cylindrical portion of said warp beam, means for restraining said exteriorly screw threaded relatively short sleeve against axial movement, and means for temporarily locking said exteriorly screw threaded relatively short sleeve against rotational movement relative to said warp beam, whenever desired.

9. A warp beam having at least at one end a hollow cylindrical portion, at least one axial slot in said portion, an end flange comprising a boss located in the interior of the hollow portion of the beam and at least one spoke extending out from the boss through the slot, a spindle extending axially within the beam and through the boss, an exteriorly screw threaded sleeve rotatably mounted on the spindle, a screw threaded axial bore in the boss through which the sleeve extends with a screw engagement, means for restraining the sleeve against axial movement, and means firmly securing said spindle to said warp beam.

10. A warp beam having at least at one end a hollow cylindrical portion, at least one axial slot in said portion, an end flange comprising a boss located in the interior of the hollow portion of the beam and at least one spoke extending out from the boss through the slot, a spindle extending axially within the beam and through the boss, an exteriorly screw threaded sleeve rotatably mounted on the spindle, a screw threaded axial bore in the boss through which the sleeve extends with a screw engagement, means for restraining the sleeve against axial movement, means firmly securing said spindle to said warp beam, and means for temporarily locking said sleeve against rotational movement relative to said spindle, whenever desired.

11. A warp beam having at least at one end a hollow cylindrical portion, at least one axial slot in said portion, an end flange comprising an interiorly screw threaded sleeve shaped portion located in the interior of said hollow portion of the beam and at least one spoke extending out from said sleeve shaped portion through said slot, an exteriorly screw threaded relatively short cylindrical member rotatably mounted within said hollow cylindrical portion of said beam passing through said interiorly screw threaded sleeve shaped portion of said end flange in screw engagement with the same, means for restraining said exteriorly screw threaded relatively short cylindrical member against axial movement, and means for temporarily locking said exteriorly screw threaded relatively short cylindrical member against rotational movement relative to said warp beam, whenever desired.

WILLIAM ATTENBOROUGH.

REFERENCES CITED

The following references are of record in the file of this patent:

UNITED STATES PATENTS

| Number | Name | Date |
|---|---|---|
| 1,800,511 | Cowles | Apr. 14, 1931 |
| 2,449,398 | Leas | Sept. 14, 1948 |

FOREIGN PATENTS

| Number | Country | Date |
|---|---|---|
| 4,000 | Great Britain | 1880 |
| 295,766 | Italy | Jan. 27, 1931 |
| 737,794 | France | Oct. 10, 1932 |